(12) United States Patent
Subbaiah et al.

(10) Patent No.: US 9,630,844 B2
(45) Date of Patent: Apr. 25, 2017

(54) HYDROMETALLURGICAL PROCESS FOR THE RECOVERY OF TELLURIUM FROM HIGH LEAD BEARING COPPER REFINERY ANODE SLIME

(71) Applicant: Council of Scientific & Industrial Research, New Delhi (IN)

(72) Inventors: Tondepu Subbaiah, Orissa (IN); Barada Kanta Mishra, Orissa (IN); Malay Kumar Ghosh, Orissa (IN); Kali Sanjay, Orissa (IN); Indra Narayan Bhattacharya, Orissa (IN); Chinmaya Kumar Sarangi, Orissa (IN); Barsha Dash, Orissa (IN); Abdul Rauf Sheik, Orissa (IN)

(73) Assignee: Council of Scientific & Industrial Research, New Delhi (IN)

( * ) Notice: Subject to any disclaimer, the term of this patent is extended or adjusted under 35 U.S.C. 154(b) by 281 days.

(21) Appl. No.: 14/463,598

(22) Filed: Aug. 19, 2014

(65) Prior Publication Data
US 2015/0053572 A1 Feb. 26, 2015

(30) Foreign Application Priority Data
Aug. 20, 2013 (IN) .......................... 2459/DEL/2013

(51) Int. Cl.
*C25B 1/00* (2006.01)
*C22B 3/04* (2006.01)
(Continued)

(52) U.S. Cl.
CPC ............... *C01B 19/02* (2013.01); *C22B 3/04* (2013.01); *C22B 7/007* (2013.01); *C25B 1/00* (2013.01);
(Continued)

(58) Field of Classification Search
CPC ................................. C25B 1/00; C22B 3/04
See application file for complete search history.

(56) References Cited

U.S. PATENT DOCUMENTS 3,933,475 A * 1/1976 Swanson ................... C22B 1/11
75/419
4,047,939 A 9/1977 Morrison
(Continued)

FOREIGN PATENT DOCUMENTS

IN 2459/DEL/2013 8/2013

OTHER PUBLICATIONS

Wang, S., "Tellurium, its resourcefulness and recovery", vol. 63, No. 8, pp. 90-93 (2011).
(Continued)

*Primary Examiner* — Nicholas A Smith
(74) *Attorney, Agent, or Firm* — Brinks Gilson & Lione

(57) ABSTRACT

A hydrometallurgical process is provided for the recovery of tellurium as elemental tellurium powder from copper refinery anode slime containing high amount of lead. The process involves the removal of copper and lead from anode slime followed by the recovery of tellurium as elemental powders. An economical and environment friendly process is provided for producing tellurium from a high lead bearing anode slime as it involves only hydrometallurgical techniques and thereby avoids emission of any polluting gases and has an efficiency of 85 to 90%. The developed process of recovering tellurium as elemental powders from copper refinery anode slime is beneficial in the production of pure tellurium instead of tellurium compounds. It helps raise the profit margin of a non-ferrous metal industry dealing with extraction of copper from ores and treatment of anode slime for the recovery of other metal values.

14 Claims, 3 Drawing Sheets

(51) Int. Cl.
  *C01B 19/02* (2006.01)
  *C22B 7/00* (2006.01)
  *C25C 3/34* (2006.01)
  *C25C 5/02* (2006.01)
(52) U.S. Cl.
  CPC .................. *C25C 3/34* (2013.01); *C25C 5/02* (2013.01); *Y02P 10/234* (2015.11)

(56) References Cited

U.S. PATENT DOCUMENTS

| | | | |
|---|---|---|---|
| 4,197,275 A * | 4/1980 | Parker | C01G 5/003 423/34 |
| 4,283,224 A | 8/1981 | Stewart | |
| 4,293,332 A | 10/1981 | Wang et al. | |
| 4,352,786 A | 10/1982 | Hoh et al. | |
| 5,160,588 A | 11/1992 | Sugawara et al. | |
| 5,939,042 A * | 8/1999 | Stafiej | C01B 19/02 423/508 |
| 2004/0118248 A1 * | 6/2004 | Ahern | C22B 7/006 75/714 |
| 2005/0255017 A1 * | 11/2005 | Okada | C22B 1/02 423/22 |
| 2010/0326840 A1 * | 12/2010 | Hisshion | C01B 19/004 205/615 |

OTHER PUBLICATIONS

Brown, R., "Selenium, tellurium, and bismuth: Supply, demand, and progress" In *Minor Elements 2000: Processing and Environmental Aspects of As, Sb, Se, Te, and Bi*, pp. 307-321 (2000).

Wang, S. et al., "A Novel Process for Recovery of Te and Se From Copper Slimes Autoclave Leach Solution", Journal of Minerals & Materials Characterization & Engineering, vol. 2, No. 1, pp. 53-64 (2003).

Amer, A. "Processing of Copper Anode-Slimes for Extraction of Metal Value", Physicochemical Problems of Mineral Processing, vol. 36, pp. 123-134 (2002).

* cited by examiner

HYDROMETALLURGICAL PROCESS FOR THE RECOVERY OF TELLURIUM FROM HIGH LEAD BEARING COPPER REFINERY ANODE SLIME

CROSS REFERENCE TO RELATED APPLICATIONS

This application claims priority under 35 U.S.C. 119 to Indian application Serial No. 2459/DEL/2013, filed on Aug. 20, 2013. The entirety of application 2459/DEL/2013 is hereby incorporated by reference herein.

FIELD OF THE INVENTION

The embodiments of the present invention relate to a hydrometallurgical process for the recovery of tellurium from high lead bearing copper refinery anode slime. More particularly, the embodiments of the present invention relate to a process for the production of tellurium as elemental powders from copper refinery anode slime, containing high amount of lead.

BACKGROUND

Tellurium finds immense application in the field of solar cells and alloys. Tellurium has been found to be the best additive for improving machinability in various types of ferritic steels (S. Wang, Journal of Metals, Vol. 63, 2011, p. 90). Although it is used in pigments, glass, lubricants, and rubber, the major application of tellurium is in solar cells (R. D. Brown, Minor Elements 2000, ed. Courtney Young, p. 307). Across the world, more than 90% of tellurium is produced from anode slimes collected from electrolytic copper refining and the remainder is derived from skimmings at lead refineries and from flue dust and gases generated during the smelting of bismuth, copper, and lead ores. The average world production of tellurium is estimated at 450 to 500 tonnes per year. Since anode slimes are the main resources for tellurium production, the estimation of reserves for tellurium is based on copper reserves. By applying a fixed recovery factor of 0.065 kg tellurium per tonne of copper, the world reserve of tellurium may be quoted as 34,000 tonnes.

In the process of electro-refining of copper, an impure copper anode is made and the anode which undergoes oxidation resulting in dissolution of copper in the electrolytic solution, which gets deposited on a cathode of copper metal or stainless steel. On the other hand, the associated impurities such as tellurium, selenium, precious group metals, etc. do not dissolve under the conditions prevailing in the electrolytic cell and settle at the bottom of the cell and are regarded as anode slimes (S. Wang et al. Journal of Minerals and Materials Characterization and Engineering, Vol. 2, 2003, p. 53). The copper anode slimes generated in the refinery unit vary widely in composition. They contain a significant amount of copper, lead, tellurium, selenium, precious group metals such as gold and silver along with a little amount of arsenic, antimony, bismuth, etc. (A. M. Amer, Physicochemical Problems of Mineral Processing, Vol. 36, 2002, p. 123). The aforementioned journal articles are hereby incorporated by reference herein.

The conventional processes implemented for the treatment of anode slimes are generally combinations of gyro- and hydrometallurgical techniques which cause undesirable emissions of selenium oxide, $SO_2$, etc. leading to environmental pollution (U.S. Pat. No. 4,293,332). Hence, a process based only on hydrometallurgical unit operations is highly desirable from not only an economical point of view, but also from an environmental point of view.

While processing anode slimes through hydrometallurgical routes, the sequence of removing or recovering various metal values has been found to be the major concern for the metallurgists. Generally, the presence of a wide variety of impurities in the anode slime makes the process of recovering metal values complex. Specifically, if a large amount of lead is present in the anode slime, the recovery of tellurium, selenium, or precious metals becomes more difficult. A variety of pyrometallurgical techniques combined with acid leach processes have been attempted; however, they are not suitable due to the difficulty in removing significant amounts of lead from anode slime prior to the recovery of tellurium and/or precious group metals.

Reference is made to U.S. Pat. No. 4,352,786, wherein the anode slime is subjected to leaching in a medium of an ammonium acetate solution at a temperature not exceeding 80° C. After separating the leach solution from the undissolved slime residue, lead is crystallized from the leach liquor and recovered as lead acetate. However, the process possesses low efficiency of extraction of lead during ammonium acetate leaching, which is about 53%. Further, the use of ammonium acetate solution of 7 M concentration to achieve lead extraction of 53% may result in high chemical consumption.

Reference is also made to U.S. Pat. No. 4,283,224, wherein lead is separated by leaching the slime with diethylene triamine followed by carbonation to precipitate lead carbonate with subsequent regeneration of the leach solution. However, the process of removal of lead is complex in nature which involves the use of said amine to dissolve lead and subsequent recovery of the dissolved lead in the form of its carbonates through bubbling of carbon dioxide. In addition, although the lead removal step has been addressed, there is no information available about the feasibility of this process for processing anode slime containing tellurium.

Although various techniques have been proposed by several researchers to remove lead prior to the recovery of tellurium, none of them have been commercially successful.

Reference is made to U.S. Pat. No. 5,160,588, wherein the anode slime is leached with sulphuric acid and tellurium is recovered from the solution after leaching by suspending at least one copper electrode plate in a bath of a leach, allowing tellurium to deposit on the surface thereof as copper telluride. However, if a process would be available to recover tellurium as elemental tellurium, then it can provide higher economic value to the technology of processing anode slime for the extraction of tellurium. But the process mentioned here above (U.S. Pat. No. 5,160,588) recovers tellurium in the form of a compound, i.e. copper telluride.

Reference is made to U.S. Pat. No. 4,047,939, wherein the slime is leached with dilute sulphuric acid at an elevated temperature under oxygen partial pressure of up to 50 psi to dissolve copper and tellurium. The tellurium is then recovered as copper telluride from the leach liquor by adding metallic copper through cementation. However, the process involves autoclave leaching of anode slime at a pressure of 50 psi and a temperature of about 115° C. It would be advantageous if sulphuric acid leaching of anode slime can be operated at low temperature and atmospheric pressure. Further, this process also does not intend to recover tellurium as elemental tellurium. The aforementioned U.S. patents are hereby incorporated by reference herein.

Even though several methods have been proposed for the recovery of tellurium from anode slimes, none of them provide a process for the production of elemental tellurium rather than a tellurium compound.

It is therefore, highly desirable to develop a process that can be implemented for the significant separation of impurities before the recovery of tellurium from copper refinery anode slimes of any composition. Thus, the embodiments of the present invention provide a novel sequence of steps for separating metal values, where initially copper is removed followed by lead recovery; and finally, tellurium is produced from copper and lead free anode slime.

SUMMARY

The disclosure provides a hydrometallurgical process for the extraction of tellurium from copper refinery anode slime. The process of extraction of tellurium includes decopperisation by sulphuric acid leaching, removal of lead through brine leaching of the decopperised anode slime, solubilisation of tellurium by sodium hydroxide leaching of the copper and lead free anode slime, and electrodeposition of tellurium powders from the alkali bath.

DETAILED DESCRIPTION

The process involves the development of a sequence of steps involving only hydrometallurgical techniques for the separation of metal values in the order of copper, lead and then tellurium from anode slime.

The disclosure provides a process for decopperisation of anode slime, lead removal from decopperised anode slime, and production of tellurium from the upgraded anode slime, free from copper and lead. The disclosure also provides a process with which it would be possible to solubilize tellurium selectively in an alkali bath. Further, the disclosure provides a process for the electrodeposition of tellurium powders at the cathode from an electrolytic bath, free from copper, lead, or any other impurity. The disclosure also provides a process for the preparation of elemental tellurium following separation of copper and lead from anode slime. Additionally, the disclosure provides a process for the elimination of any waste generated in the process of the extraction of tellurium from copper refinery anode slime.

The embodiments of the present invention relate to a process for the extraction of tellurium from high lead bearing copper refinery anode slimes involving only hydrometallurgical processing routes, wherein at the outset removal of copper and lead from anode slimes is done followed by the recovery of tellurium as elemental powders.

A unique sequence of steps for removal of metal values such as copper and lead prior to the recovery of tellurium from anode slime is followed. One objective is to recover tellurium from anode slime without losing selenium and/or precious group metal values present in the anode slime.

Figure 1:
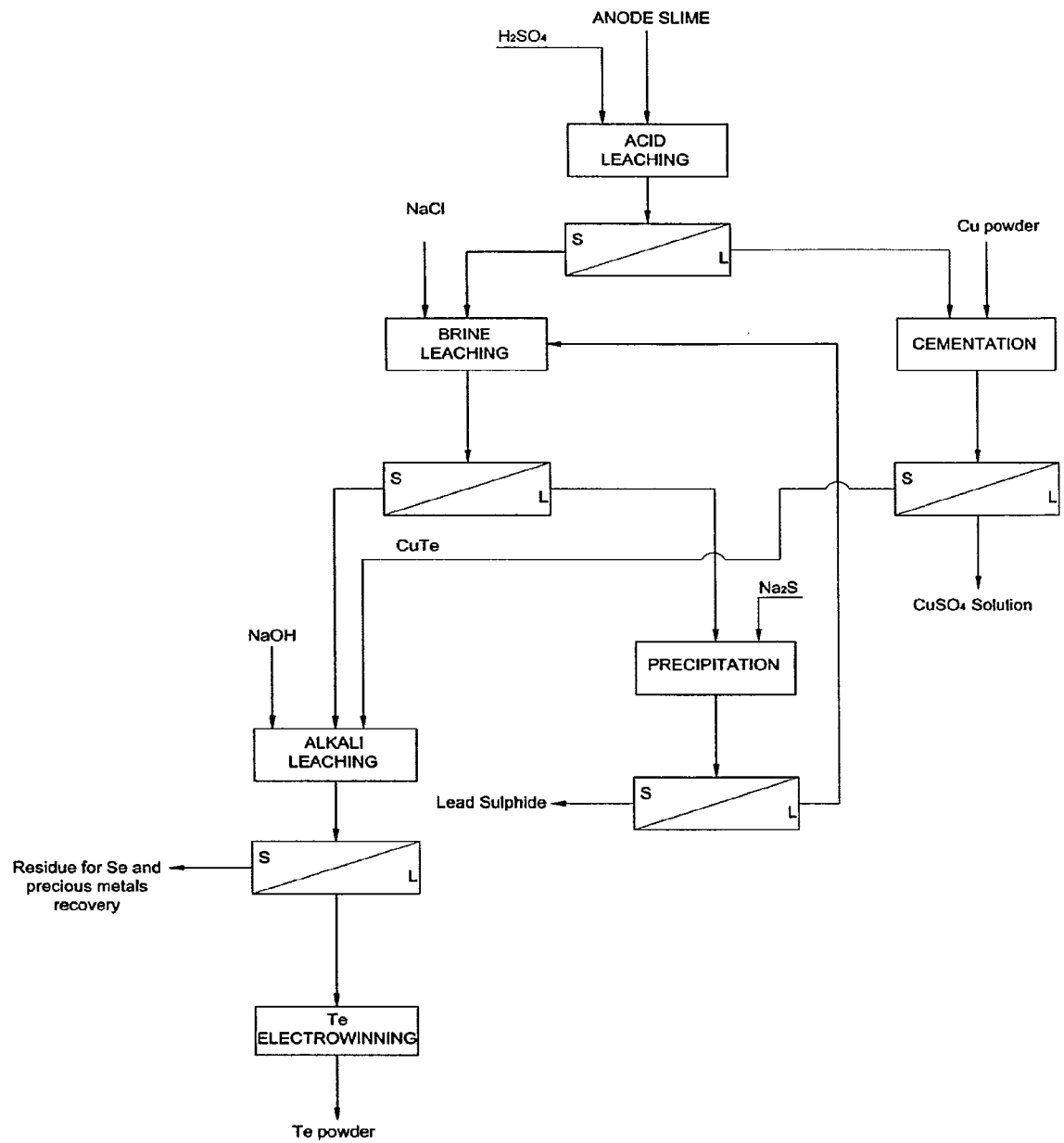
FIG. 1 is a process flow sheet for the production of tellurium from high lead bearing anode slime.

Accordingly, the embodiments of the present invention provide a process for the recovery of tellurium from copper refinery anode slime through hydrometallurgical processing routes. The process flow sheet has been revealed in FIG. 1. "S" and "L" in FIG. 1 indicate solid and liquid, respectively. The high lead bearing anode slime is leached with sulphuric acid to dissolve copper in the leach liquor. About 10% of tellurium is also found to dissolve along with copper, which is recovered as copper telluride through cementation by adding copper powders to the acid leach liquor. The residue obtained from the acid leaching is then subjected to brine leaching for the selective dissolution of lead generating a residue enriched with tellurium, selenium, and precious metals. The brine leach liquor is treated with sodium sulphide to recover lead as lead sulphide through precipitation. Following the removal of copper and lead, the upgraded anode slime and cemented copper telluride obtained from cementation in sulphuric acid leach liquor are treated together by sodium hydroxide leaching to bring tellurium in the alkali leach liquor, leaving selenium and precious metals in the leach residue. Subsequent to alkali leaching, the tellurium is recovered in the powdery form by electrodeposition involving reduction of tellurite ions at the cathode.

In an embodiment of the present invention, the process is based only on hydrometallurgical unit operations involving leaching, cementation, precipitation, and electrowinning. Electrowinning is the electrodeposition of metals from their ores that have been put in solution through a process commonly referred to as leaching.

Figure 2A:
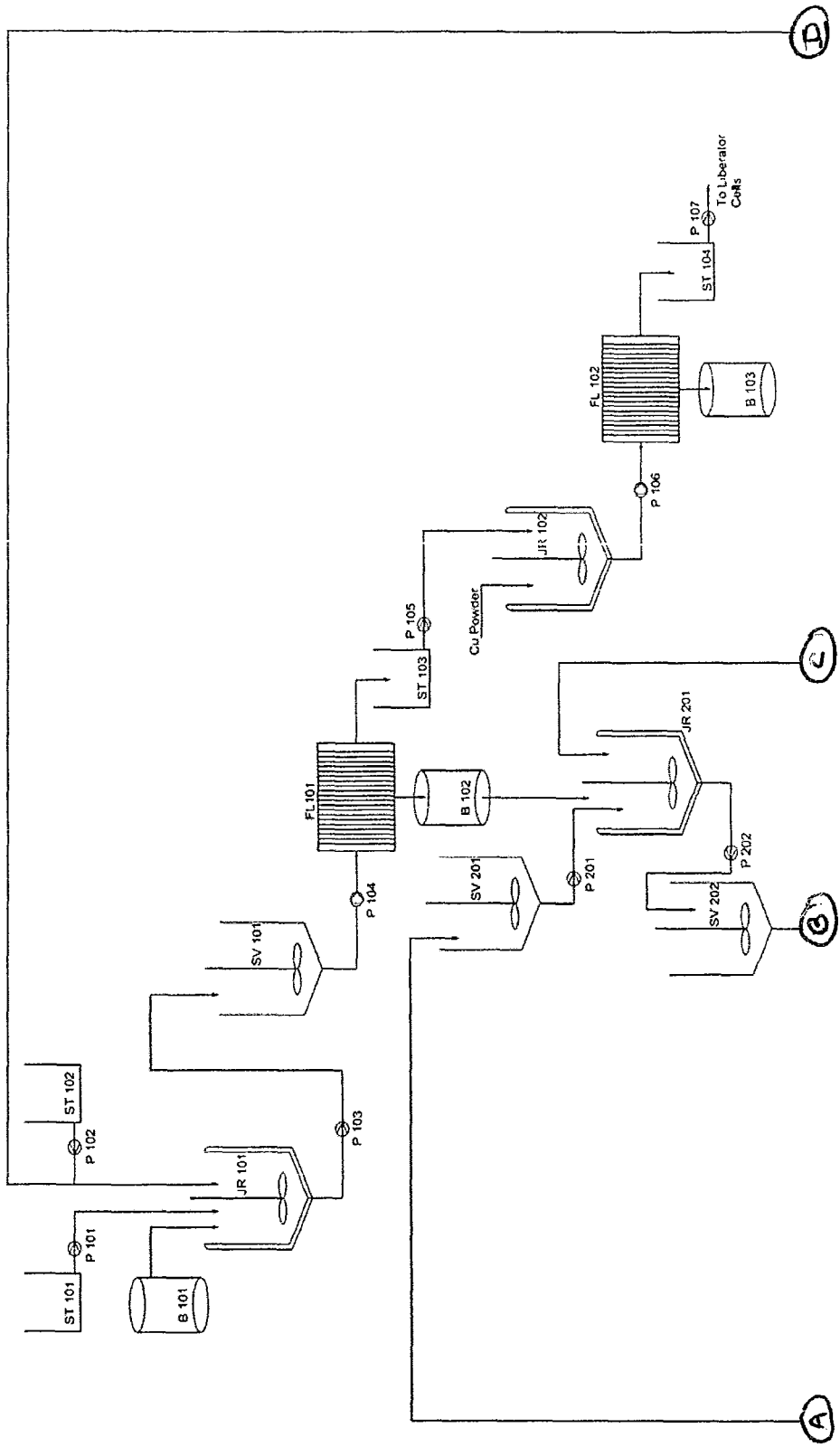
FIG. 2A and FIG. 2B are equipment flow diagrams for the production of tellurium from high lead bearing anode slime.
Figure 2B:
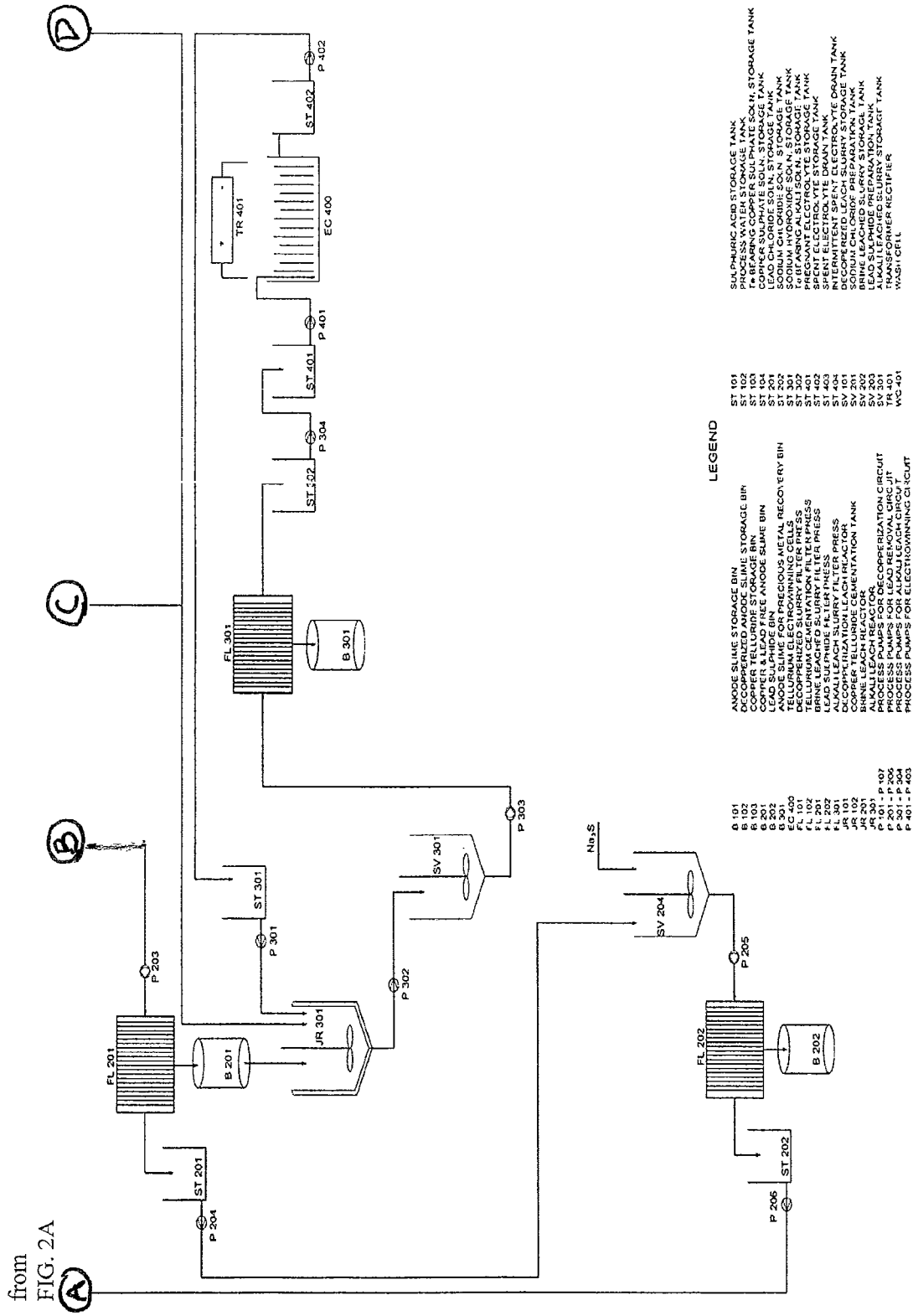

FIG. 2A and FIG. 2B depict the unit processes and various equipment such as leaching reactors, filter press for solid-liquid separation, precipitation/cementation reactors, electrowinning cell, storage tanks, bins, and pumps that may be required in the running of the process for the production of tellurium from anode slime. The process is divided into four sections. Section 100 deals with the decopperisation of raw anode slime. Section 200 is related to the equipment for brine leaching of decopperised anode slime for the removal of lead. Section 300 shows the equipment that may be required for alkali leaching of the upgraded anode slime, free from copper and lead, for the solubilisation of tellurium in the liquor. Section 400 details the electrowinning of tellurium from the alkali electrolytic bath.

In FIG. 2A and FIG. 2B, B 101 is an anode slime storage bin, B 102 is a decopperized anode slime storage bin, B 103 is a copper telluride storage bin, B 201 is a copper and lead free anode slime bin, B 202 is a lead sulphide bin, B 301 is an anode slime for precious metal recovery bin, EC 400 are tellurium electrowinning cells, FL 101 is a decopperized slurry filter press, FL 102 is a tellurium cementation filter press, FL 201 is a brine leached slurry filter press, FL 202 is a lead sulphide filter press, FL 301 is an alkali leach slurry filter press, JR 101 is a decopperization leach reactor, JR 102 is a copper telluride cementation tank, JR 201 is a brine leach reactor, JR 301 is an alkali leach reactor, P 101-P 107 are process pumps for a decopperization circuit, P 201-P 206 are process pumps for a lead removal circuit, P 301-P 304 are process pumps for an alkali leach circuit, P 401-P 403 are process pumps for an electrowinning circuit, ST 101 is a sulphuric acid storage tank, ST 102 is a process water storage tank, ST 103 is a Te bearing copper sulphate solution storage tank, ST 104 is a copper sulphate solution storage tank, ST 201 is a lead chloride solution storage tank, ST 202 is a sodium chloride solution storage tank, ST 301 is a sodium hydroxide solution storage tank, ST 302 is a Te bearing alkali solution storage tank, ST 401 is a pregnant electrolyte storage tank, ST 402 is a spent electrolyte storage tank, ST 403 is a spent electrolyte drain tank, ST 404 is an intermittent spent electrolyte drain tank, SV 101 is a decopperized leach slurry storage tank, SV 201 is a sodium chloride preparation tank, SV 202 is a brine leached slurry storage tank, SV 203 is a lead sulphide preparation tank, SV 301 is an alkali leached slurry storage tank, TR 401 is a transformer rectifier, and WC 401 is a wash cell.

In another embodiment of the present invention, the decopperisation may require a leaching medium containing sulphuric acid of 0.9 to 1.3 M concentration, lead dissolution from decopperised anode slime needs 5.5 to 6 M NaCl solution as brine leaching medium and alkali leaching of tellurium may require a leachant of 0.8 to 1.2 M NaOH.

In yet another embodiment of the present invention, the tellurium is recovered from the alkali leach liquor by electrolysis at an ambient temperature under galvanostatic conditions using cathodes and anodes made of stainless steel 304 grade.

In one embodiment of the present invention, a process is provided for the recovery of tellurium as elemental powders from high lead bearing copper refinery anode slime including a sequence of decopperisation of anode slime, removal of lead from the decopperised anode slime, solubilisation of tellurium in an alkali bath, and electrowinning of tellurium powders from the alkali bath.

According to another embodiment of the present invention, a process is provided wherein copper is removed by acid leaching of anode slime in a solution containing 0.9 to 1.3 M sulphuric acid.

In yet another embodiment of the present invention, a process is provided wherein tellurium, co-dissolved during decopperisation step, is cemented out as copper telluride by adding copper powders with Te to Cu ratio of 1:5 in the sulphate solution.

In one embodiment of the present invention, a process is provided wherein the cemented copper telluride is processed further along with the upgraded anode slime, free from copper and lead, for the recovery of tellurium.

According to one embodiment of the present invention, a process is provided wherein lead is separated from the decopperised anode slime by brine leaching using a leachant containing 5.5 to 6 M NaCl.

In still another embodiment of the present invention, a process is provided wherein lead is recovered as lead sulphide through precipitation by adding sodium sulphide with Pb to $Na_2S$ ratio of 2:1 in the lead chloride solution.

In yet another embodiment of the present invention, a process is provided wherein tellurium is solubilized by alkali leaching of copper and lead free anode slime and the cemented copper telluride using 0.8 to 1.2 M NaOH solution, avoiding co-dissolution of selenium or precious metals.

In still another embodiment of the present invention, a process is provided wherein tellurium is recovered as elemental powder through electrodeposition.

In yet another embodiment the present invention, a process is provided wherein tellurium is electrowon from an alkali bath with a purity level of 99.92 to 99.95%.

In still another embodiment of the present invention, a process is provided wherein electrodeposition of tellurium is carried out at a current density of 150 $A/m^2$ using stainless steel 304 grade electrodes.

In yet another embodiment of the present invention, a process is provided wherein the current efficiency and energy consumption for electrowinning of tellurium are about 85% and 2 kWh/kg, respectively.

In still another embodiment of the present invention, a process is provided wherein generation of any waste is eliminated.

The use of the technique of brine leaching dissolves lead selectively from the decopperised anode slime, avoiding undesirable co-dissolution of tellurium, selenium, or precious metals. In one embodiment, tellurium is recovered as elemental tellurium powders rather than any of its compounds. The use of the electrodeposition process results in the production of tellurium of high purity grade. It provides a safer and environment friendly process in comparison to pyrometallurgical processes of treating anode slime for the recovery of different metal values.

In comparison to the prior art, the present process is more economical and environment friendly for producing tellurium from a high lead bearing anode slime. The process involves only hydrometallurgical techniques and thereby avoids emission of any polluting gases.

In one embodiment of the present invention, tellurium is extracted from high lead bearing anode slime with an efficiency of 85 to 90%.

In one embodiment, the raw anode slime was first leached in diluted sulphuric acid solution to dissolve copper as copper sulphate in the leach liquor. The acid leach residue generated in the copper removal step was then leached in brine solution to separate lead from the decopperised anode slime. The reactions involved in the dissolution of metal values during different leaching processes can be represented as follows.

$$Cu + \tfrac{1}{2}O_2 + H_2SO_4 = CuSO_4 + H_2O \quad (1)$$

$$Cu_2O + \tfrac{1}{2}O_2 + H_2SO_4 = 2CuSO_4 + 2H_2O \quad (2)$$

$$Cu_2Te + 2O_2 + 2H_2SO_4 = 2CuSO_4 + H_2TeO_3 + H_2O \quad (3)$$

$$PbSO_4 + 2NaCl = PbCl_2 + Na_2SO_4 \quad (4)$$

$$Cu_2Te + 2NaOH + 1.5O_2 = Cu_2O + Na_2TeO_3 + H_2O \quad (5)$$

$$Cu_2Te + 2NaOH + 2O_2 = 2CuO + Na_2TeO_3 + H_2O \quad (6)$$

The lead chloride liquor, produced in the brine leaching step, was treated with sodium sulphide to recover lead as lead sulphide through precipitation. On the other hand, the brine leach residue, free from copper and lead, was then leached in sodium hydroxide solution to solubilize tellurium. About 10% of tellurium dissolution was also observed to occur during decopperisation stage, which was recovered as copper telluride through cementation using copper powder. The cemented copper telluride was leached in sodium hydroxide solution along with the brine leach residue. Thus, the alkali liquor, generated in the present stage, was subjected to electrowinning to deposit tellurium powders at the cathode. The cathodic and anodic reactions during electrowinning of tellurium in a strong alkali electrolytic bath can be expressed as follows:

$$\text{At cathode: } TeO_3^{2-} + 3H_2O + 4e^- = Te + 6OH^- \, E°=-0.413 \, V^* \quad (7)$$

$$\text{At anode: } 4OH^- = 2H_2O + O_2 + 4e^- \, E°=0.401 \, V^* \quad (8)$$

*Relative to a standard hydrogen electrode (SHE)

E° is the equilibrium potential at a pH of 14, temperature of 25° C. and $TeO_3^{2-}$ concentration of 1 mol/L and the oxygen pressure of 1 atm. Closer inspection of these reactions shows that the hydroxyl ions, consumed during leaching, are regenerated during electrowinning.

The residue obtained from alkali leaching step was found to contain primarily selenium and precious group metals, which could be processed further for the recovery of the respective valuables.

In the embodiments of the present invention, the high lead bearing anode slime is processed through a hydrometallurgical route to extract tellurium in elemental powder form. The compositions of three different anode slime samples treated during this invention have been given in Table 1.

TABLE 1

Chemical composition of anode slimes

| Elements | Percentage, % | | |
|---|---|---|---|
| | A | B | C |
| Copper | 12 | 9.02 | 18.5 |
| Lead | 19.5 | 26.79 | 12.7 |
| Tellurium | 2.3 | 1.47 | 3 |
| Selenium | 7.14 | 3.45 | 6 |
| Antimony | 5.43 | 3.04 | 3.7 |
| Arsenic | 4.25 | 1.69 | 7 |

The raw anode slime was leached in sulphuric acid solution to dissolve copper values selectively. The decopperisation was carried out at an ambient temperature (33 to 37° C.) and atmospheric pressure (14.7 psi). Copper is present in slime primarily as $Cu_2O$ and on reacting with sulphuric acid, it results in the dissolution of copper in the solution. During decopperisation, tellurium and selenium may also dissolve along with copper. The tellurium co-dissolution was found to be less than 10%; whereas, that of selenium was eliminated by controlling the acidity and temperature. The dissolved tellurium was recovered as copper telluride through cementation by adding copper powder to the sulphate liquor so that any loss of tellurium in the copper sulphate solution could be avoided. Subsequent to cementation, the copper sulphate liquor was sent to the liberator cells for the recovery of copper. On the other hand, the acid leach residue was found to consist of insoluble lead, tellurium, selenium, and precious metals.

The acid leach residue was then subjected to brine leaching using NaCl solution as a medium for preferential dissolution of lead values from the decopperised anode slime. The high lead content in the slime, principally present as lead sulphate, was removed by brine leaching. Unless lead is separated from the decopperised slime, a higher consumption of alkali is expected during the alkali leaching step because lead is soluble in alkali as plumbate ion. The lead values were hence brought to the leach liquor as lead chloride, which was then treated with sodium sulphide to recover lead as lead sulphide through precipitation.

The brine leach residue mainly comprised of tellurium, selenium, and precious metals along with a small amount of antimony and bismuth. To extract tellurium, the copper and lead free slime together with the copper telluride cemented from acid liquor (explained in the aforementioned stage) was subjected to NaOH leaching. During alkali leaching, tellurium was preferentially solubilized leaving selenium and precious metals in the residue. Although under the prevailing conditions of alkali leaching, selenium is little prone to dissolving in the liquor; appropriate control of leaching parameters such as NaOH concentration, temperature, and time are able to avoid the dissolution of selenium to a great extent. The alkali leach liquor generated as a result of NaOH leaching was subjected to electrolysis for the recovery of tellurium. During electrochemical deposition of tellurium from the alkali bath, tellurium was deposited at the stainless steel cathode in the powdery form. On the other hand, hydroxyl ions underwent oxidation to generate electrons and oxygen at the anode made of stainless steel.

One aspect of the claimed process is the recovery of tellurium as elemental tellurium powders from anode slimes containing high amount of lead using only hydrometallurgical processing techniques, wherein the developed sequence of steps for the removal of metal values, i.e. decopperisation followed by lead removal, which minimizes difficulty in the production of tellurium from anode slimes, plays a crucial role.

EXAMPLES

The following examples are given by way of illustration and therefore should not be construed to limit the scope of the embodiments of the present invention.

Example 1

This example illustrates the process for the extraction of tellurium from copper refinery anode slime sample (A). Raw anode slime of 1 kg is leached with a pulp density (solid to liquid ratio) of 20% at ambient temperature for one hour in sulphuric acid solution of 1.1 M concentration. The decopperisation efficiency is found to be about 92.2%. About 9.5% of tellurium dissolves along with copper, which is cemented out by adding copper powders with Te to Cu ratio of 1:5 in the sulphate liquor. Cementation is carried out at a temperature of 80° C. and continued for 2 h. The copper telluride produced as a result of cementation is processed further along with the brine leach residue for the recovery of tellurium.

The decopperised anode slime is then leached with a pulp density of 10% in NaCl solution of 5.8 M concentration at a temperature of 90° C. for one hour. The leaching recovery for lead is about 84.6%. Co-dissolution of tellurium or selenium during brine leaching is not observed. By adding sodium sulphide to the lead chloride solution with Pb to $Na_2S$ ratio of 2:1, lead sulphide is precipitated out.

Following copper and lead removal, the upgraded slime together with the cemented copper telluride is subjected to alkali leaching in NaOH solution of 1 M concentration with a pulp density of 10% at a temperature of 80° C. for 4 h. The percentage of extraction of tellurium is observed to be about 85.6%. The precious metals and selenium remain unaffected during the solubilisation of tellurium in NaOH solution. The alkali liquor containing tellurium about 6.56 g/L with a minimal amount of impurities such as lead and antimony is subjected to electrolysis to recover tellurium. The electrodeposition of tellurium is carried out at a current density of 150 $A/m^2$ using stainless steel 304 electrodes. The current efficiency and energy consumption for tellurium deposition are found to be about 85% and 2.0 kWh/kg, respectively. The presence of impurities within a concentration limit of 50 ppm in the electrolytic solution hardly affects electrodeposition of tellurium since tellurium is more nodular with respect to lead and antimony. Tellurium deposits are found to be in powdery form and the purity of the deposits is about 99.92%.

Example 2

Anode slime sample (B) of 1 kg is decopperised through leaching in 0.9 M sulphuric acid solution at ambient temperature with a pulp density of 20% for an hour. The decopperisation efficiency is found to be about 91.8%. About 8.8% tellurium dissolved along with copper is cemented out by adding copper powders with Te to Cu ratio of 1:5 in the sulphate liquor at 80° C. Cementation is continued for 2 h and the copper telluride produced due to cementation is processed further along with the brine leach residue for the recovery of tellurium.

The decopperised anode slime is then leached in NaCl solution of 6 M concentration with a pulp density of 10% at 90° C. for one hour. The leaching recovery for lead is about 85%, and there is no loss of tellurium or selenium in the brine leach liquor. Lead sulphide is precipitated by adding sodium sulphide to the lead chloride solution with Pb to $Na_2S$ ratio of 2:1.

Following the separation of copper and lead, the upgraded slime along with the cemented copper telluride is leached in a NaOH solution of 0.8 M concentration at 80° C. with a pulp density of 10% for 4 h. The percentage of extraction of tellurium is found to be about 90.1%. The precious metals and selenium stay unaffected during the solubilisation of tellurium in NaOH solution. Tellurium is recovered through electrodeposition from the alkali liquor containing about 4.46 g/L tellurium. The electrodeposition of tellurium is carried out at a current density of 150 A/m$^2$ using stainless steel 304 electrodes. The current efficiency and energy consumption for tellurium deposition are found to be about 84.8% and 2.01 kWh/kg, respectively. Tellurium deposits are found to be in powdery form and the purity of the deposits is about 99.95%.

Example 3

This example demonstrates the process for the production of tellurium from copper refinery anode slime sample (C). One kilogram of raw anode slime is leached with a pulp density of 20% at ambient temperature for an hour in sulphuric acid solution of 1.3 M concentration. The leaching efficiency for copper is observed to be about 92%. About 9.5% of tellurium dissolves along with copper, which is recovered as copper telluride through cementation by adding copper powders with Te to Cu ratio of 1:5 in the sulphate liquor. Cementation is carried out at a temperature of 80° C. and continued for 2 h. The copper telluride is processed further along with the brine leach residue for the recovery of tellurium.

The decopperised anode slime is then leached in NaCl solution of 5.5 M concentration with 10% pulp density at a temperature of 90° C. for one hour. The leaching recovery for lead is about 84.7% and co-dissolution of tellurium or selenium along with lead is not observed. Lead is recovered as lead sulphide through precipitation by adding sodium sulphide to the lead chloride solution with Pb to $Na_2S$ ratio of 2:1.

Subsequent to copper and lead removal, the upgraded slime together with the cemented copper telluride is subjected to alkali leaching in NaOH solution of 1.2 M concentration at a temperature of 80° C. with a pulp density of 10% for 4 h. The percentage of extraction of tellurium is observed to be about 87.8%. Co-dissolution of precious metals or selenium is not observed during the solubilisation of tellurium in NaOH solution. Tellurium is electrowon from the alkali liquor containing about 8.78 g/L tellurium. The electrodeposition of tellurium is carried out at a current density of 150 A/m$^2$ using stainless steel 304 electrodes. The current efficiency and energy consumption for tellurium deposition are found to be about 85.2% and 1.98 kWh/kg, respectively. Tellurium deposits are found to be in powdery form and the purity of the deposits is about 99.94%.

The invention claimed is:

1. A hydrometallurgical process for the recovery of tellurium as elemental powder from high lead bearing copper refinery anode slimes, wherein the process comprises:
   decopperisation of an anode slime bearing lead and tellurium;
   removal of the lead from the decopperised anode slime by brine leaching to form a lead chloride solution;
   solubilisation of the tellurium in an alkali bath; and
   electrowinning of tellurium powders from the alkali bath.

2. The process of claim 1, wherein copper is removed by acid leaching of anode slime in a solution containing 0.9 to 1.3 M sulphuric acid.

3. The process of claim 1, wherein tellurium co-dissolved during decopperisation step is cemented out as copper telluride by adding copper powder resulting in a Te to Cu ratio of 1:5 in the sulphate solution.

4. The process of claim 1, wherein removal of the lead from the decopperised anode slime by brine leaching comprises introducing into the decopperised anode slime a leachant containing 5.5 to 6.0 M NaCl.

5. The process of claim 1, wherein lead is recovered as lead sulphide through precipitation by adding sodium sulphide with Pb to $Na_2S$ ratio of 2:1 in the lead chloride solution.

6. The process of claim 3, wherein tellurium is solubilized by alkali leaching of copper and lead free anode slime and the cemented copper telluride using 0.8 to 1.2 M NaOH solution, avoiding co-dissolution of selenium or precious metals.

7. The process of claim 1, wherein tellurium is recovered as elemental powders through electrowinning.

8. The process of claim 1, wherein tellurium is electrowon from an alkali bath with a purity level of 99.92 to 99.95%.

9. The process of claim 1, wherein electrowinning of tellurium is carried out at a current density of 150 A/m$^2$ using stainless steel 304 grade electrodes.

10. The process of claim 1, wherein the current efficiency and energy consumption for electrowinning of tellurium are 85% and 2 kWh/kg respectively.

11. The process of claim 6, wherein the alkali leaching of the copper, lead free anode slime, and the cemented copper telluride occurs together using 0.8 to 1.2 M NaOH solution.

12. The process of claim 3, wherein the process is carried out in the order of:
   first, decopperisation of an anode slime bearing lead and tellurium;
   second, recovery of the copper telluride through cementation;
   third, removal of the lead from the decopperised anode slime by brine leaching to form a lead chloride solution;
   fourth, solubilisation of the tellurium in an alkali bath; and
   fifth, electrowinning of tellurium powders from the alkali bath.

13. The process of claim 3, wherein the process is carried out in the order of:
   first, decopperisation of an anode slime bearing lead and tellurium;
   second, removal of the lead from the decopperised anode slime by brine leaching to form a lead chloride solution;
   third, recovery of copper telluride through cementation;
   fourth, solubilisation of the tellurium in an alkali bath; and
   fifth, electrowinning of tellurium powders from the alkali bath.

14. The process of claim 1, wherein the anode slime bearing lead and tellurium comprises from 12.7 to 26.79 percent lead by weight.

* * * * *